Sept. 5, 1967     M. A. BEALLE     3,339,743
PORTABLE WATER PURIFIER
Filed July 16, 1964
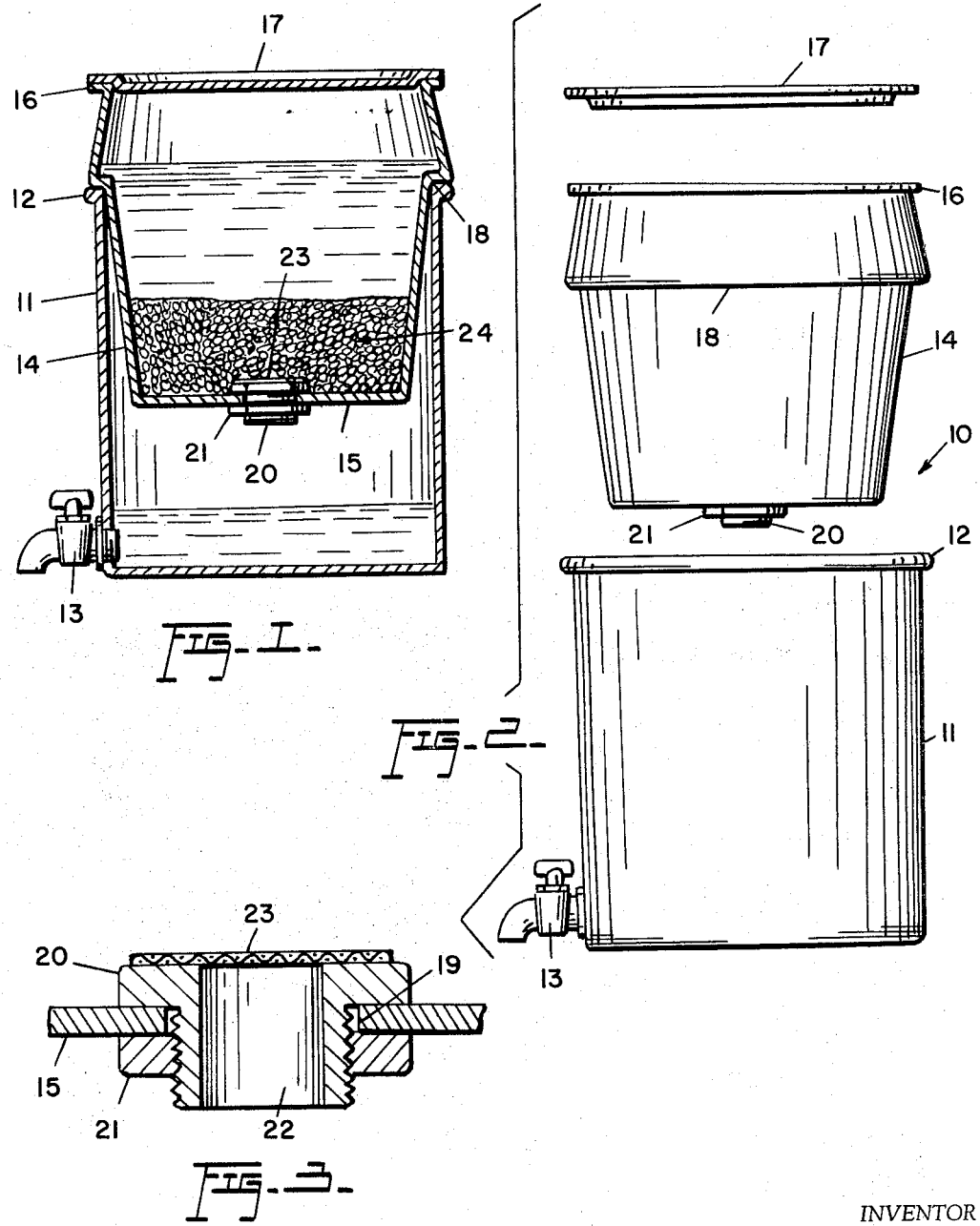
INVENTOR
MORRIS A. BEALLE
BY *Munson H. Lane*
ATTORNEY 3,339,743
PORTABLE WATER PURIFIER
Morris A. Bealle, 1018 18th St. NW.,
Washington, D.C. 20006
Filed July 16, 1964, Ser. No. 383,153
1 Claim. (Cl. 210—256)

ABSTRACT OF THE DISCLOSURE

A portable water purifier comprising an upper container holding a mixture of anion and cation resins and a lower supporting container for receiving the purified water.

---

This invention relates to new and useful improvements in water filters and method, and the principal object of the invention is to provide a simple, self-contained and portable apparatus and method which may be conveniently employed for purifying drinking water, as for example, in homes, offices, on picnics, while traveling, and the like.

As such, the apparatus of the invention comprises superposed lower and upper containers, the bottom of the upper container having an outlet covered by a small mesh screen. A granular purifying agent is placed in the upper container and water to be purified is poured over the agent. The agent consists of a mixture of anion and cation resins, as a function of which ion exchange takes place in the upper container and impurities in solution in the water are extracted. Such impurities are retained in the agent, while pure water passes through the screened outlet into the lower container in readiness for use.

Since the purifying action results from an exchange of ions brought about by the addition of water to the anion and cation resins of the purifying agent, the outlet screen serves merely to retain the granular agent in the upper container so that such purifying agent does not pass with the purified water into the lower container. When after several cycles of operation the agent becomes loaded with impurities to such extent that its ability to exchange ions is substantially reduced, the used agent may be readily emptied and a fresh supply thereof placed in the upper container, or, if desired, the purifying agent may be regenerated in situ as is well known to those skilled in the art.

The apparatus of the invention is highly effective in filtering out chlorides, aluminum, copper, calcium, magnesium, sulphates, fluorides, as well as radioactive fallout.

Being fully self-contained and portable as it is, the apparatus does not require connection to a water supply, may be easily transported from one place of use to another, may be quickly and conveniently serviced, and lends itself to economical manufacture and inexpensive maintenance.

With the foregoing more important objects and features in view and with other objects and features as may become apparent as this specification proceeds, the invention will be understood from the following description taken in conjunction with the accompanying drawings, wherein like characters of reference are used to designate like parts, and wherein:

FIGURE 1 is a vertical sectional view of the water purifying apparatus of the invention, showing the same in use;

FIGURE 2 is a group elevational view of the components of the apparatus; and

FIGURE 3 is an enlarged, fragmentary sectional detail of the upper container outlet and screen.

Referring now to the accompanying drawings in detail, the water purifying apparatus of the invention is designated generally by the reference numeral 10. The same embodies in its construction a cylindrical lower receptacle or container 11 which has an open upper end defined by an outturned marginal lip or rim 12, while the bottom portion of the container 11 is equipped with a suitable drain tap or faucet 13.

Superposed on the lower container 11 is an upper container or receptacle 14 having a bottom 15 and an open upper end defined by an outturned annular lip 16. The open upper end of the container 14 may be closed by a removable cover 17 which seats on the lip 16 as shown. The side wall of the upper container 14 is radially inwardly stepped so as to form an annular, downwardly facing shoulder 18 in a plane intermediate the upper and lower ends of the upper container, the shoulder 18 being removably seated on the lip or rim 12 when the two containers are superposed as illustrated in FIGURE 1. The upper container 14 is preferably although not necessarily tapered, both upwardly and downwardly from the shoulder 18 and the relative dimensions of the containers 11, 14 are such that when they are superposed, the bottom 15 of the upper container 14 is spaced substantially above the bottom of the lower container so as to provide ample space for purified water which drains into the lower container. The bottom 15 of the upper container 14 is provided with a central opening 19 (see FIGURE 3) in which is positioned an externally screw-threaded plug 20, retained in place by a nut 21. The plug 20 has a central outlet passage 22 which is covered by a fine mesh screen 23, soldered or otherwise secured to the top of the plug.

When the apparatus is placed in use, a quantity of granular purifying agent 24 is placed in the upper container 14 and with the upper container superposed on the lower container 11, water to be purified is poured into the upper container over the purifying agent. The agent consists of a mixture of anion and cation resins which, in the presence of water, bring about an ion exchange, causing impurities in solution in the water to be extracted and embodied into the resins of the purifying agent, while pure water drains through the screen 23 and outlet passage 22 into the lower container 11. It will be noted that apart from catching relatively large particles of foreign matter such as may be present in the water in the upper container 14, the screen 23 does not participate in the water purifying action which is carried out solely by the ion exchange of the resins when water is added to the upper container. However, the screen 23 does serve to retain the granular agent 24 in the upper container, so that it does not pass with the purified water into the lower container. The purified water, of course, may be drained as required from the lower container through the faucet 13.

As previously pointed out the purifying agent 24 is in granular form and preferably comprises a mixture of cationic and anionic exchange resins which may be used in any desired relative proportions, depending on the particular characteristics of the fluid to be purified.

A preferred purifying agent is a mixture of anionic and cationic exchange resins known as "Monobed" manufactured by Rohm & Haas Company, Philadelphia, Pa., and defined in Reinhold's Condensed Chemical Dictionary, vol. 6, as an intimate mixture of Amberlite cation and anion exchange resins. As the cationic resin I prefer to use "Amberlite IR–120," and as the anionic component of the mixture I prefer to use "Amberlite IRA–410." Amberlite IR–120 is more fully described in Technical Bulletin IE–10–55 of the Rohm & Haas Company, dated April 1955 (Rev. March 1960), while Amberlite IRA–410 is more fully described in Technical Bulletin IE–3–55 of the same company, dated February 1955 (Rev. June 1963).

The relative proportions of anionic and cationic exchange resins may be widely varied but for many purposes a mixture of approximately equal quantities by weight of each resin may be employed, but the proportions may be widely varied between the ranges of 99 parts anionic resin to 1 part of cationic resin to 1 part of anionic resin to 99 parts of cationic resin, though preferably the range is from 60 parts anionic resin to 40 parts cationic, to 40 parts anionic to 60 parts cationic resin.

In an actual laboratory test made by competent research chemists using tap water drawn from the water supply of the city of Baltimore, Md., such water which initially contained substantial quantities of chlorides, fluorides, and sulfates as well as metal ions such as aluminum, copper, calcium and magnesium, was passed through the apparatus of the invention and impurities detected in the purified water were as follows:

| | Parts per million |
|---|---|
| Chlorides (Cl) | 0.0 |
| Aluminum (Al) | 0.0 |
| Copper (Cu) | 0.0 |
| Calcium (Ca) | 0.0 |
| Magnesium (Mg) | 0.0 |
| Sulfates ($SO_4$) | 0.0 |
| Fluorides (F) | 0.0 |

In another actual laboratory test, a simulated radioactive fallout sample in water was prepared, containing strontium-90, yttrium-90, iodine-131, cesium-137, barium-140, lanthanum-140, zirconium-95 and niobium-95. Equal amounts of the water were placed in two separate bottles and the bottles were gamma counted to insure uniformity. The water in one of the bottles was treated by the apparatus of the invention, and when comparison tests were made with the untreated water in the other bottle, the following data was obtained:

| | Untreated | Treated |
|---|---|---|
| Gamma Activity (counts/minute) | 1,616.0 | 163.0 |
| Percent Gamma Activity remaining | | 10.1 |
| Beta Activity (counts/minute) | 2,418.6 | 260.6 |
| Percent Beta Activity remaining | | 10.8 |

The above indicates that approximately 90% of the total simulated fallout was removed from the water by the apparatus of the invention.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

I claim:

A water purifying apparatus, comprising in combination a lower container for purified water, said lower container having an upper edge provided with an outturned annular lip, an upper container removably superposed on said lower container, the upper end portion of said upper container being radially inwardly stepped to provide a downwardly facing annular shoulder removably seated on said lip of the lower container, said upper container having a bottom and the lower end portion of the upper container extending downwardly from said shoulder being of such vertical dimension that said bottom of the upper container is spaced above the bottom of the lower container when the containers are superposed, said lower end portion of the upper container extending downwardly from said shoulder being downwardly tapered toward said bottom and thereby radially inwardly spaced from the side wall of the lower container, a purifying agent comprising a mixture of anion and cation resins provided in the upper container, and a screened outlet provided in the bottom of the upper container whereby water placed in the upper container and purified by said purifying agent may drain into the lower container, said bottom of the upper container being provided with a central aperture, said screened outlet comprising a plug formed with a central passage and including an externally screw-threaded body portion extending through said aperture and an enlarged head seated on the upper surface of said upper container bottom, a keeper nut provided on said screw-threaded body portion of the plug at the underside of said bottom for removably retaining the plug in position, and a screen secured to said head of the plug in overlying relation to said passage, said plug and said screen being removable as a unit from the bottom of the upper container upon removal of said nut from the plug.

References Cited

UNITED STATES PATENTS

| 426,911 | 4/1890 | Burke | 210—474 |
| 919,583 | 4/1909 | Houck | 210—476 |
| 1,014,843 | 1/1912 | Nobles | 210—476 |
| 1,628,394 | 5/1927 | Montmorency | 210—474 |
| 3,038,610 | 6/1962 | Hetherington | 210—282 X |

FOREIGN PATENTS

| 25,730 | 1913 | Great Britain. |

JOSEPH SCOVRONEK, *Acting Primary Examiner.*

E. G. WHITBY, *Assistant Examiner.*